Oct. 23, 1923.
J. W. KRIKAVA
BINDER
Filed Dec. 4, 1922
1,472,010
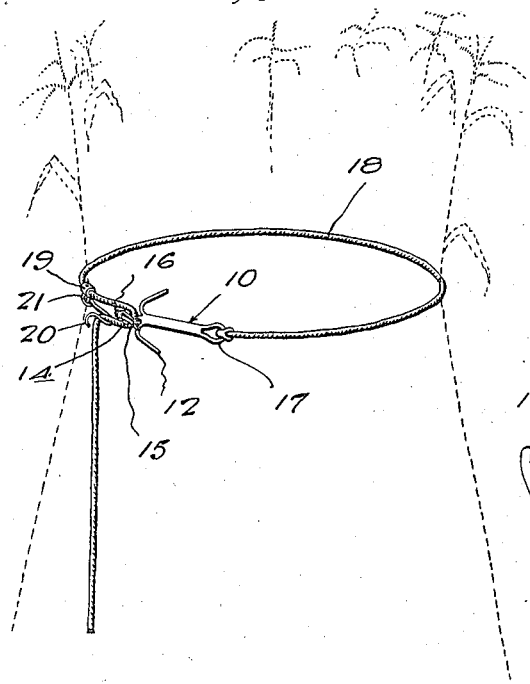
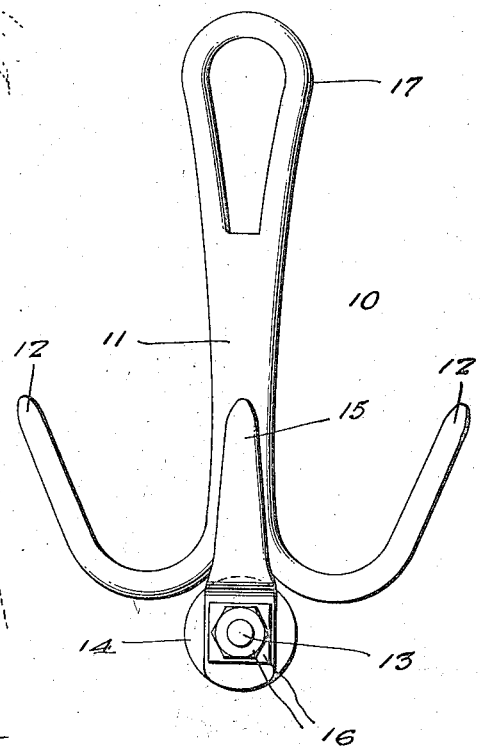
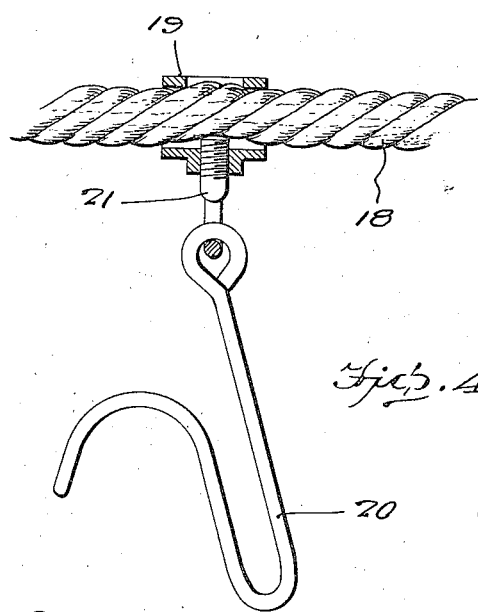
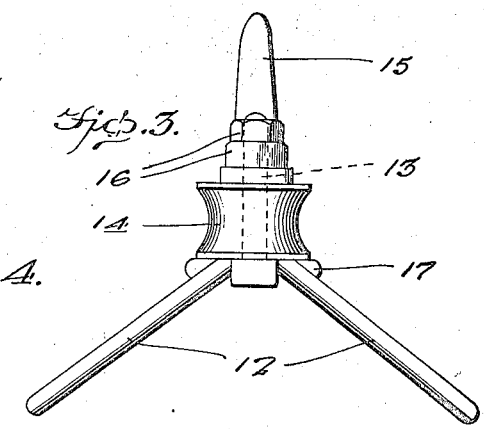
J. W. Krikava
INVENTOR
BY Victor J. Evans
ATTORNEY
WITNESS:

Patented Oct. 23, 1923.

1,472,010

UNITED STATES PATENT OFFICE.

JAMES W. KRIKAVA, OF MYRTLE, MINNESOTA.

BINDER.

Application filed December 4, 1922. Serial No. 604,948.

*To all whom it may concern:*

Be it known that I, JAMES W. KRIKAVA, a citizen of the United States, residing at Myrtle, in the county of Freeborn and State of Minnesota, have invented new and useful Improvements in Binders, of which the following is a specification.

This invention relates to binders for use in shocking corn, fodder and the like and has for an object the provision of a binder which may be placed temporarily around the shock, whereby the latter may be easily and quickly compressed and held to facilitate the application of a permanent binder.

Another object of the invention is the provision of a binder as above stated, which is simple and durable in construction and which may be easily and quickly applied without requiring the operator to walk around the shock.

With the above and other objects in view, the invention further includes the following novel features and details of construction, to be hereinafter more fully described, illustrated in the accompanying drawings and pointed out in the appended claims.

In the drawings:—

Figure 1 is a perspective view of the invention in use, a shock being shown by dotted lines.

Figure 2 is an enlarged elevation of the shock engaging member.

Figure 3 is an end view of the same.

Figure 4 is an enlarged section through the sleeve carried by the flexible member.

Referring in detail to the drawings wherein like characters of reference denote corresponding parts, the invention as shown, comprises a shock engaging member which is designated generally at 10. This member includes a shank 11 which carries at one end shock penetrating fingers 12, the latter extending outwardly and toward the opposite end of the shank in hook formation. Also extending from this end of the shank 11 is a stub shaft or pintle 13, upon which is mounted a grooved roller 14, the said roller operating between the shank and the arm 15 which is also mounted upon the stub shaft or pintle 13. This arm 15 is secured thereon by means of nuts 16 and extends outwardly and toward the opposite end of the shank substantially the same as the arms 12.

The opposite end of the shank 11 is provided with an eye 17, to which is attached one end of a rope or similar flexible member 18. This rope is adapted to be passed around a shock and has mounted thereon a sleeve 19. This sleeve carries a hook 20 which is adapted to engage and grip the rope 18 in a manner to be hereinafter described and in order to secure the hook to the sleeve there is provided an eye bolt 21 which has a threaded engagement with said sleeve. The inner end of the bolt 21 is adapted to bite into the rope 18 so as to hold the sleeve against movement, but the latter may be adjusted longitudinally of the rope by loosening the eye bolt 21, whereupon the sleeve may be slid longitudinally to the desired position and held against accidental movement by tightening the bolt.

In the use of the invention, the rope is swung around the shock with the shock engaging member at the free end of the rope and one or more of the fingers 12 or 15 will penetrate and engage the shock, whereupon the rope is passed around the pulley 14 in loop formation and the hook 20 engaged over the rope. This method of application obviates the necessity of the operator walking around the shock and saves considerable time and labor.

The invention is susceptible of various changes in its form, proportions and minor details of construction and the right is herein reserved to make such changes as properly fall within the scope of the appended claims.

Having described the invention what is claimed is:—

1. A shock binder comprising in combination with a flexible member, a shock engaging member secured to one end thereof, a sleeve slidable upon the flexible member, a flexible member engaging means carried by the sleeve and combined means for securing the flexible member engaging means to the sleeve and for holding the latter against sliding movement.

2. A shock binder comprising in combination with a flexible member, a shock engaging member secured to one end thereof and including a shank, shock penetrating fingers extending from one end thereof and a guide for the flexible member and means carried by the flexible member whereby the latter may be secured in loop formation to the guide.

3. A shock binder comprising in combination with a flexible member, a shock engaging member secured to one end thereof and including a shank, a plurality of shock penetrating fingers extending outwardly from one end of the shank toward the opposite end, a flexible member guide carried by the shank and means carried by the flexible member, whereby the latter may be secured in loop formation to the guide.

In testimony whereof I affix my signature.

JAMES W. KRIKAVA.